(12) United States Patent
Labrunie et al.

(10) Patent No.: US 7,944,179 B2
(45) Date of Patent: May 17, 2011

(54) METHOD FOR CHARGING A STORAGE ELEMENT OF AN AUTONOMOUS SYSTEM

(75) Inventors: Antoine Labrunie, Chambery (FR); Pierre Perichon, Voiron (FR)

(73) Assignee: Commissariat a l'Energie Atomique, Paris (FR)

( * ) Notice: Subject to any disclaimer, the term of this patent is extended or adjusted under 35 U.S.C. 154(b) by 635 days.

(21) Appl. No.: 12/149,366

(22) Filed: Apr. 30, 2008

(65) Prior Publication Data

US 2008/0278118 A1 Nov. 13, 2008

(30) Foreign Application Priority Data

May 11, 2007 (FR) ...................................... 07 03370

(51) Int. Cl.
*H01M 10/44* (2006.01)
(52) U.S. Cl. ...................................................... 320/150
(58) Field of Classification Search .................. 320/107, 320/112, 114, 132, 150, 153; 324/427, 431, 324/430, 433
See application file for complete search history.

(56) References Cited

U.S. PATENT DOCUMENTS

| 5,652,502 | A | * | 7/1997 | van Phuoc et al. | 324/427 |
| 6,137,292 | A | * | 10/2000 | Hirsch et al. | 324/427 |
| 6,266,576 | B1 | | 7/2001 | Okada et al. | |
| 7,058,484 | B1 | * | 6/2006 | Potega | 320/134 |
| 2005/0040786 | A1 | | 2/2005 | Ichinose et al. | |
| 2006/0261830 | A1 | | 11/2006 | Taylor | |
| 2006/0276938 | A1 | | 12/2006 | Miller | |

FOREIGN PATENT DOCUMENTS

GB 2 417 378 A 2/2006

* cited by examiner

*Primary Examiner* — Edward Tso
(74) *Attorney, Agent, or Firm* — Oliff & Berridge, PLC

(57) ABSTRACT

The charging method comprises limiting, according to the temperature, of the power supplied to the storage element to a charging setpoint power. The energy required to charge the storage element is determined and the period during which the power resource will be available is estimated. A theoretical mean power is calculated by means of these two items of information. The progressions of the temperature and of a maximum acceptable power are estimated. A maximum energy able to be delivered by the generator is calculated from the maximum acceptable power. The value of the charging setpoint power is defined by comparison of the required energy with the maximum energy and by comparison of the mean power with the maximum acceptable power.

16 Claims, 3 Drawing Sheets

METHOD FOR CHARGING A STORAGE ELEMENT OF AN AUTONOMOUS SYSTEM

BACKGROUND OF THE INVENTION

The invention relates to a method for charging a power storage element of an autonomous system comprising electronic components, from a generator, with limiting, according to the temperature, of the power supplied to the storage element to a charging setpoint power.

STATE OF THE ART

An autonomous system has to present both a high service quality (permanent power supply) and a great reliability. The service quality imposes charging the batteries to the maximum as soon as power is available to ensure maximum autonomy in case of a long period during which resources are low.

Concerning the reliability, it is preferable to limit the charging power when the ambient temperature is high, so as to limit the internal temperature of the components. The active or passive components do in fact represent the main source of malfunctioning and the lifetime of the components depends on their temperature. The higher the temperature the shorter the lifetime of the components (active or passive). The temperature of the components depends on the temperature of the environment of the autonomous system and on the temperature rise due to dissipation of a part of the charging power. It is also preferable to limit large temperature variations. These variations originate mainly from large current peaks or variations but also from cyclic thermal variations and thermal shocks. In addition, limiting the charging and discharging currents enables an additional thermal contribution to be avoided.

Most autonomous systems currently use derating. This technique consists in limiting the maximum permitted power according to the temperature, from a threshold temperature $\theta_s$, as illustrated in FIG. 1. In the example represented, the maximum input power Pe is constant up to threshold temperature $\theta s$ and then decreases linearly when the temperature exceeds this threshold temperature. The conventional progression of the power supplied by the generator (curve D in broken line), of the acceptable power (curve B in unbroken line) and of the energy accumulated in the battery (E, hatched) during a day is illustrated schematically in FIG. 2. In this way, limiting the power at high temperatures prevents immediate destruction of the system components and ensures a minimum service.

However, the thermal protection performed by derating is limited. Firstly, the latter focuses on the maximum temperature, however below this threshold temperature, the reliability of the components fluctuates enormously. The reliability is represented schematically by the Mean Time Between Failures (MTBF) and is dependent on the temperature. For example an increase of 18° C. of the junction temperature of a power transistor divides the MTBF by two. Secondly, derating does not limit the thermals shocks and cyclic thermal variations. These two points have a great influence on reliability. For example, the MTBF is divided by two each time the junction temperature ripple increases by 15° C.

The current density also has a notable effect on the reliability of the system and, in the prior art, the current is not limited so long as it does not cause a large temperature rise.

However, as a whole, derating does not enable the reliability of the system to be improved. Indeed, this technique, illustrated in FIG. 2, does not enable power peaks at the terminals of the storage element to be prevented and therefore does not limit charging current peaks. This operating mode therefore does not enable operation at a temperature as stable and as low as possible.

Another important factor to be taken into account to improve the reliability of the system is the operating temperature of the battery.

Batteries, whatever their technology, also see their lifetime reduced if they are used under poor thermal conditions. Operation at low temperature induces a slowing-down of the kinetics of the chemical and electrochemical reactions at the electrode/electrolyte interfaces. The charging and discharging currents have to be limited for, when cold, transportation of ion matter in the electrolyte and diffusion thereof in the active sites of the electrodes are kinetically slowed-down. Reduction of the currents on charging and discharging enables the electrochemical reactions to take place right through to the core of the active material. In the opposite case, the reactions take place mainly at the surface of the pores, with obstruction of the latter by the reaction by-products and reduction of the progression of ions in the electrolyte. The resulting phenomena lead to an irreversible loss of capacity of the element (obstruction of active sites for a lithium-ion battery for example) and/or a reduction of the battery lifetime (consumption of the electrolyte for a Nickel-Metal Hydride battery for example).

Operation at high temperature with a high state of charge accelerates the formation kinetics of the secondary or irreversible reactions which take place mainly in the middle or at the end of charging (water electrolysis for a Ni—MH battery, structural modification of the positive active material of the lithium-ion battery for example). For these reasons, the end of charging voltages are frequently regulated according to the temperature. In spite of this, inevitable but weak chemical degradation phenomena at ambient temperature are enhanced at high temperature.

Most present-day charge regulators merely disconnect the battery from its source and/or from its load when the measured parameters are outside specifications. Moreover a large number of regulators raise or lower the voltage regulation thresholds according to the temperature. These systems thereby enable immediate destruction of the battery to be avoided by limiting the operating temperature and voltage swing. However, the protection provided by the regulator is limited as it does no more than perform disconnection at a maximum temperature, however even below this limit, the battery lifetime varies enormously.

OBJECT OF THE INVENTION

The object of the invention consists in alleviating the above-mentioned shortcomings and in particular in improving the reliability of the storage system without reducing the service quality.

According to the invention, this object is achieved by the fact that the method comprises
  an estimation of the time period during which the power resource available to the generator is, up to a preset moment, greater than a preset threshold value,
  an estimation of the temperature progression up to said moment,
  estimation of the progression of a maximum acceptable power ($P_{MAX}$) up to said moment, according to the temperature progression and to data representative of the reliability of the system according to the temperature,
  determination of the required energy (E) to charge the storage element (1), calculation, according to the required energy (E) and to said time period, of a theoretical mean power ($P_M$), spread over said time period to come, to be delivered to the storage element (1) to charge the latter completely, estimation from the maximum acceptable power ($P_{MAX}$) of a maximum energy ($E_{MAX}$) able to be delivered by the generator during the time period to come, determination of a charging setpoint power according to the comparison between the required energy (E) and the maximum energy ($E_{MAX}$) and to the comparison between the mean power ($P_M$) and the maximum charging power ($P_{MAX}$).

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF A PREFERRED EMBODIMENT OF THE INVENTION

Figure 1:
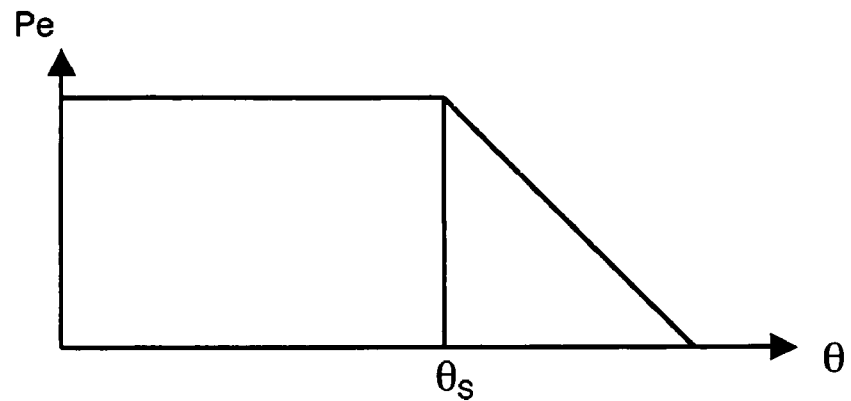
FIGS. 1 and 2 schematically illustrate the variations of the maximum input power versus temperature (FIG. 1) and the corresponding progression, during a normal day, of the power supplied by the generator (curve D in broken line), of the maximum acceptable power (curve B in unbroken line) and of the energy accumulated in the battery (E, hatched) during a day, by a derating method according to the prior art.
Figure 2:
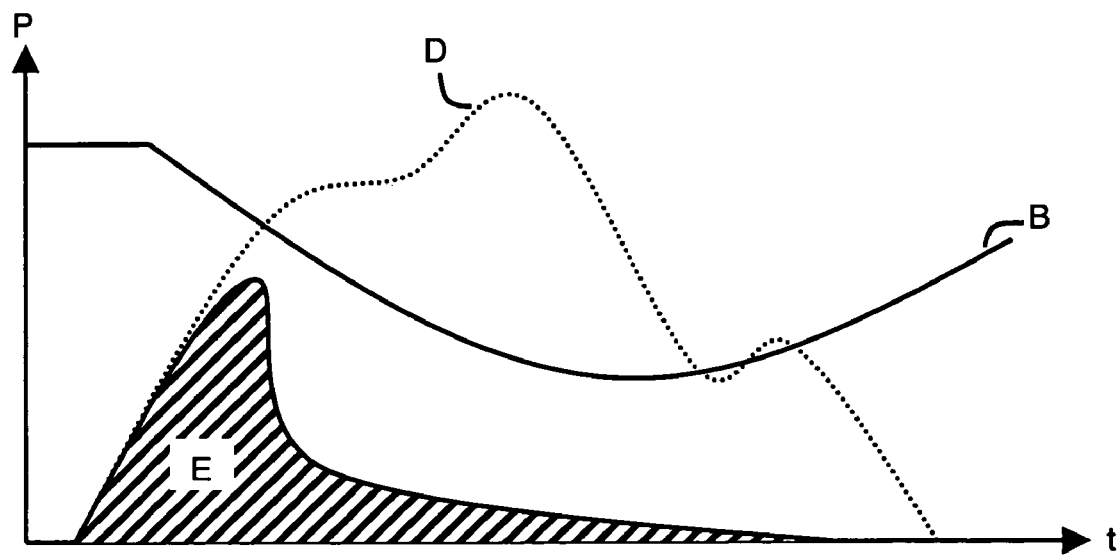
Figure 3:
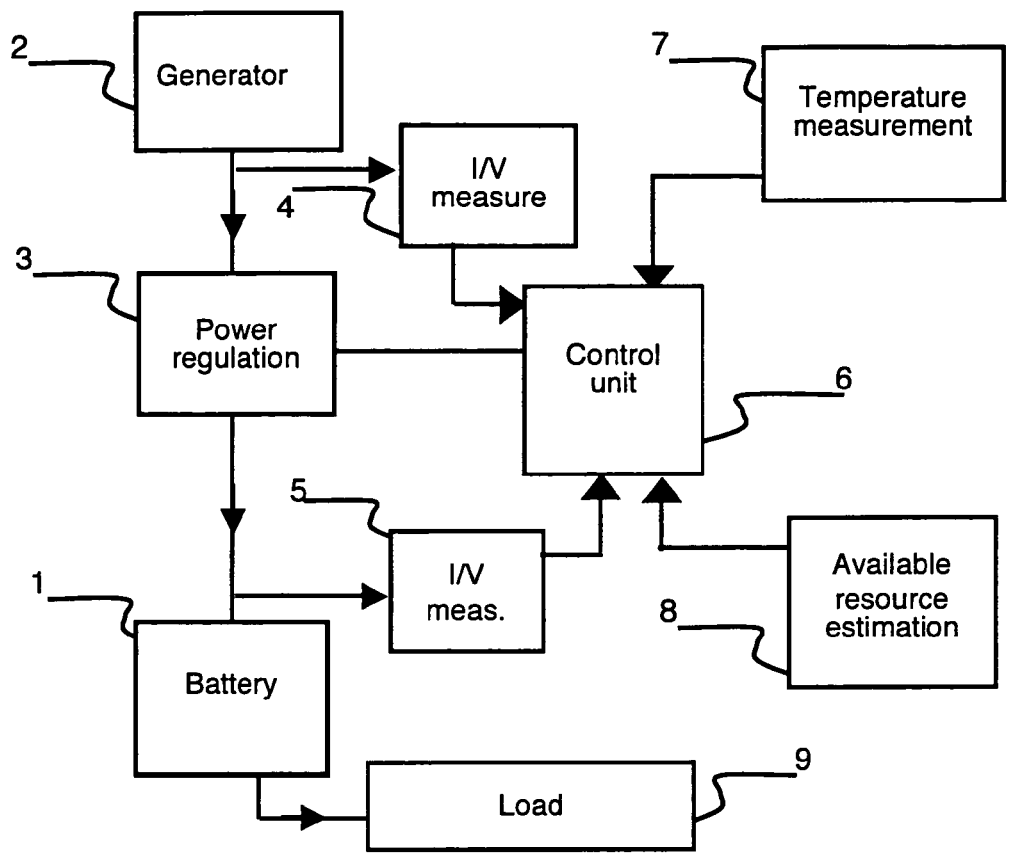
FIG. 3 schematically represents an autonomous system in which the method according to the invention can be implemented.

As illustrated in FIG. 3, the autonomous system comprises at least one battery 1 as power storage element, a power generator 2 and a power regulator 3 connected between the generator 2 and the battery 1. Measuring circuits 4 and 5 respectively enabling the voltage and current at the output of the generator 2 and at the terminals of the battery 1 to be measured are connected to a control unit 6, also connected to the power regulator 3. A temperature measuring circuit 7 and a module 8 for estimating the power resource available to the generator 2 are also connected to the control unit 6. A load unit 9 is conventionally supplied by the battery 1.

The temperature measuring circuit 7 comprises at least one ambient temperature measuring sensor and, preferably, a sensor measuring the temperature of the electronic components and a sensor measuring the temperature of the battery 1. However, in another embodiment, tables can be used to estimate the temperature of the electronic components and/or of the battery 1 according to the ambient temperature and/or to another temperature sensor that is more representative and easier to implement.

The power generator 2 is for example a photovoltaic panel or a micro-hydraulic device.

The power regulator 3 preferably comprises a BUCK converter. The regulator 3 advantageously also comprises a Maximum Power Point Tracking (MPPT) device and a battery charger. The control unit 6 is thus designed to regulate the charge of the battery 1 by means of the power regulator 3 and to manage matching between the power supplied by the generator 2 and charging of the battery 1.

The control unit 6 can determine the power at the output of the generator 2 from measurements of the voltage and current supplied by measuring circuit 4. In known manner, the control unit 6 can determine the state of charge of the battery 1 according to the temperature of the battery 1, the voltage at the terminals of the battery 1 (supplied by measuring circuit 5) and the current delivered by this battery, for example by means of tables. This estimation of the state of charge is advantageously used by the control unit 6 to define the power requirements of the battery 1 by means of charge algorithms of known type. Estimation of the state of charge can be performed according to the method used either before charging the battery 1 or periodically. In the case where determination of the state of charge is only performed before charging, when exiting standby mode, the control unit 6 will continuously calculate the power supplied to the battery 1 and the power delivered by the latter.

The module 8 for estimating the power resource available to the generator 2 as a function of time is preferably integrated in the control unit 6 and contains stored data relating to the supply conditions of power resources to the generator 2 as a function of time. The data is for example, when the generator 2 is formed by photovoltaic panels which only provide energy during the day-time, the theoretical amount of sunlight, the sunset hour, the time remaining until sunset and the theoretical progression of the temperature at the date considered. For this type of application, operation is scheduled for the forthcoming day.

In the case where the generator 2 is of micro-hydraulic type, the data is for example the period during which the hydraulic flowrate is greater than a predetermined threshold.

The module 8 for estimating the available power resource also advantageously enables the actual conditions recorded over an immediately preceding predetermined period to be stored, for example over the past three days for a photovoltaic installation. The recorded conditions then in particular comprise the power delivered over the previous days, the actual progression of the measured temperature and the effective period of daylight. These actual conditions of previous days can then be used by the control unit 6 to weight the theoretical data associated with the previously stored date involved.

The control unit 6 is thus able to estimate at the beginning of the day, and then all through the day, the power able to be supplied by the generator 2 according to the scheduled sunlight conditions and to the progression of the temperature over the forthcoming day.

In a more general manner, for a generator 2 supplying power in intermittent and quasi-periodic manner, the operating conditions over a predetermined number of immediately preceding periods are preferably stored in memory in the module 8.

Figure 4:
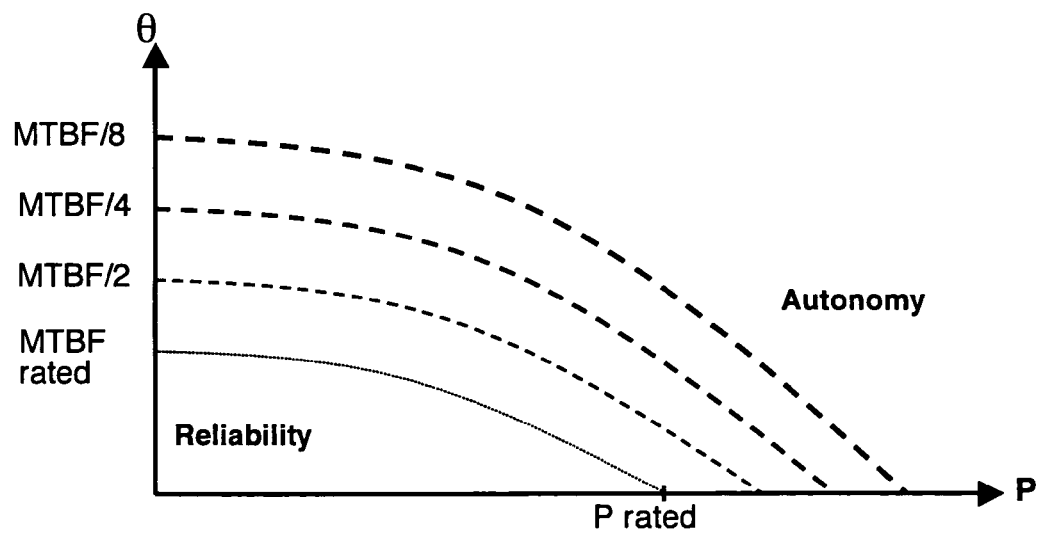
FIG. 4 represents the relation between the temperature (θ) and charging power (P) for different values of a reliability criterion constituted by the mean time between failures.

The control unit 6 regulates charging of the battery 1 also taking account of the data representative of the reliability, for example of the electronic components and of the battery 1, versus the power and temperature. FIG. 4 represents a set of curves illustrating the temperature θ versus power P for different values of an electronic component reliability criterion, more particularly mean time between failures. The control unit 6 uses this data to determine the maximum acceptable power $P_{MAX}$, notably according to the progression of the temperature for the forthcoming day and to the reliability criterion retained, this power being the power not to exceed to guarantee the reliability criterion chosen by the user, as well as its progression over the forthcoming day. The control unit 6 can advantageously take into account a current density not to be exceeded. Likewise, the control unit can update maximum acceptable power $P_{MAX}$ and its progression over the forthcoming day according to the actual temperature progression.

A particular example of operation of a standalone system supplied by a photovoltaic panel 2 whose autonomy is provided by storage batteries 1, is described below.

When the power supplied by the photovoltaic panel 2 exceeds a minimum power threshold, the control unit 6 triggers a standby exit procedure.

The control unit 6 determines a progression of the maximum acceptable power $P_{MAX}$, for the forthcoming day, according to the reliability criterion previously defined by the user, for example the mean time between failures, and the temperature progression forecast for the forthcoming day.

The control unit 6 then determines the current state of charge SOC of the battery 1, for example from measurement of the voltage at the terminals of the battery 1, from its temperature, and by means of tables, and therefore the energy required E to perform full charging of the battery 1.

The previously estimated maximum acceptable power $P_{MAX}$ then enables the control unit 6 to calculate the maximum energy $E_{MAX}$, also estimated, able to be delivered to the battery 1 under the forecasted climatic conditions over the whole duration of the sunlight.

The control unit 6 then determines the theoretical mean charging power $P_M$ according to the energy required E and the scheduled amount of sunlight. This theoretical mean power $P_M$ corresponds to the constant mean power which should be input to the battery 1 during the scheduled theoretical sunlight period, supplied by the available power resource estimation module 8. The theoretical mean power $P_M$ is obtained by calculating the ratio between the required energy E and the theoretical sunlight period. The control unit 6 can thus spread the power supplied to the battery 1 during charging of the latter, over the sunlight period, so as to avoid power peaks when the operating conditions enable an available resource to be scheduled over a sufficient time period.

The control unit 6 then compares the required energy E to charge the battery 1 and the maximum energy $E_{MAX}$ to then define the value of a charging setpoint power $P_L$ which represents the maximum power that can be delivered to the terminals of the battery 1 at a given moment. The charging setpoint power $P_L$ must never be more than the maximum acceptable power $P_{MAX}$ in order not to infringe the limitation imposed to guarantee the reliability criterion retained.

If the required energy E is lower than the maximum energy $E_{MAX}$, then the maximum energy able to be delivered to the battery 1 should be sufficient. The control unit 6 then controls the regulator 3 so that the charging setpoint power $P_L$ is constituted by the lower power between the mean power $P_M$ and the maximum acceptable power $P_{MAX}$. The setpoint power $P_L$ is thus equal to the mean power $P_M$ so long as the latter is lower than the maximum acceptable power $P_{MAX}$. In the opposite case, the setpoint power $P_L$ is equal to the maximum acceptable power $P_{MAX}$.

If the required energy E is greater than the maximum energy $E_{MAX}$ over the forthcoming day, the maximum energy able to be delivered to the battery 1 will be less than its requirements. The control unit 6 then controls the power regulator 3 in such a way that the charging setpoint power $P_L$ is equal to the maximum acceptable power $P_{MAX}$ whatever the value of the mean power $P_M$, to accumulate the maximum amount of energy while at the same time respecting the reliability criterion defined by the user.

The setpoint power $P_L$, normally equal to the maximum acceptable power $P_{MAX}$, therefore goes to the mean value $P_M$ when $E<E_{MAX}$ and $P_M<P_{MAX}$.

Due to this operating principle, at the beginning of the day, the control unit 6 spreads the charging power of the storage elements 1 over the estimated operating time of the generator 2. In this way, the autonomous system avoids large current variations and the resulting temperature variations as far as possible, while at the same time guaranteeing the reliability of the electronic components of the system.

The state of charge SOC of the battery 1 and the power remaining to be input are determined periodically by the control unit 6 either directly from a measurement or according to a measurement at the beginning of the day and adjustment by the powers input to and output from the battery 1. The data relative to the operating conditions, such as the outside temperature, are also recorded periodically. The required energy E and the theoretical mean power $P_M$, and also the maximum acceptable power $P_{MAX}$ and the maximum energy $E_{MAX}$, are thus recalculated and compared periodically throughout the day. The values of the mean power $P_M$ and the maximum acceptable power $P_{MAX}$ change throughout the day and, according to the progression of these data in the course of the day, the charging setpoint power $P_L$ can vary between the mean power $P_M$ and the maximum acceptable power $P_{MAX}$.

For example purposes, operation over a day of an autonomous system comprising a photovoltaic panel 2 designed to charge a storage battery 1 will be described in the following with reference to FIG. 5. The latter represents the different measured and estimated powers versus time.

At the beginning of the day, on exit from standby mode at a time $t_0$, the control unit 6 has in memory the number of sunlight hours forecast for the forthcoming day (for example 10 hours). The control unit 6 also determines a theoretical progression of maximum acceptable power $P_{MAX}$ (curve A, with $P_{MAX}$ varying between 20 W and 14 W at time $t_0$), from the temperature progression forecast for the forthcoming day and the reliability criterion chosen by the user. The control unit 6 then calculates theoretical maximum energy $E_{MAX}$ (170 Wh in the example considered) according to the progression of the maximum acceptable power. This energy $E_{MAX}$ can be weighted by the progression of the temperature recorded during the previous days. The control unit 6 then determines the required energy E to be input to the battery 1 to charge the latter (for example 100 Wh). Then it calculates, from these two data, the theoretical mean power $P_M$ (10 W) for constant charging spread over the whole of the forecasted sunlight period.

The required energy E and the maximum energy $E_{MAX}$ are then compared to define the charging setpoint power value $P_L$ to be used. In the example considered, the required energy E (100 Wh) is less than the maximum energy $E_{MAX}$ (170 Wh) and, at time $t_0$, the theoretical mean power $P_M$=10 W is less than the maximum acceptable power $P_{MAX}$(20 W). the charging setpoint power $P_L$ is therefore equal to the mean power $P_M$.

Figure 5:
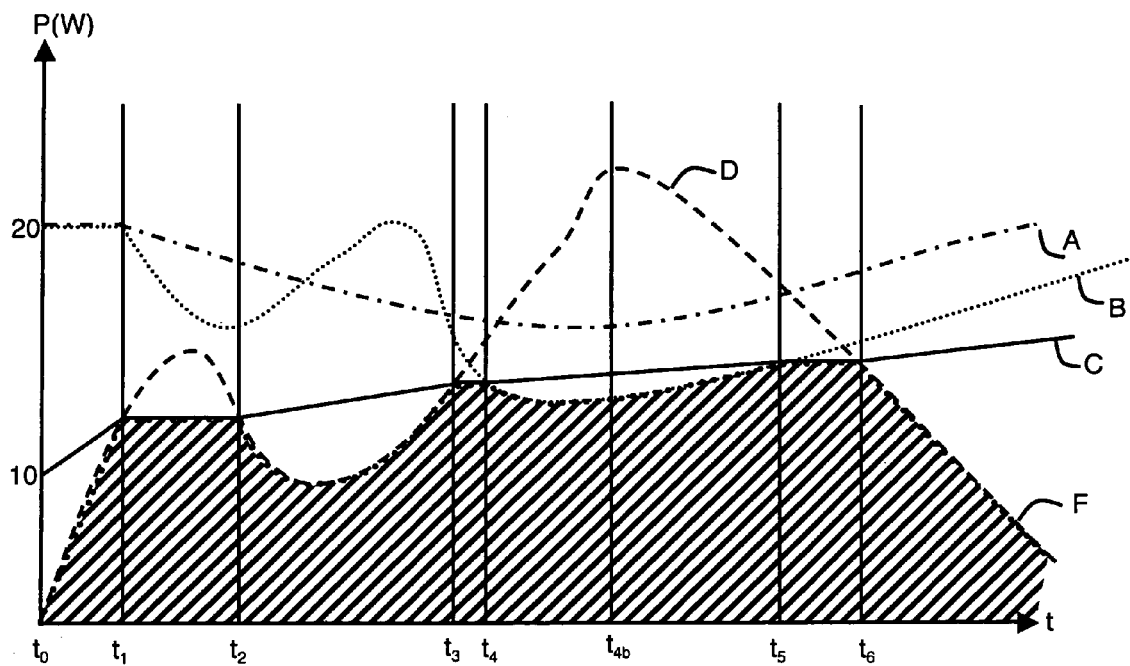
FIG. 5 schematically represents the progression of the different powers representative of the autonomous system wherein the power storage element which is charged, during one day, by a charging method according to the invention.

In FIG. 5, the different curves respectively represent:
Curve A: estimation at the beginning of the day of the theoretical maximum acceptable power (theoretical $P_{MAX}$).
Curve B: actual progression of maximum acceptable power $P_{MAX}$.
Curve C: progression of mean power $P_M$ during the day.
Curve D: progression of the maximum power able to be delivered by the generator.
Curve F: progression of the actual charging power at the battery terminals.

At the beginning of the day, between $t_0$ and $t_1$, the irradiance is low and the power delivered by the generator 2 (curve D) is less than the mean power $P_M$ calculated by the control unit 6 to spread charging over the next ten hours. The actual charging power supplied to the battery 1 (curve F) is then the power supplied by the generator 2 (curve D). The control unit 6 then periodically recalculates the value of the mean power $P_M$ to take account of the charging actually performed. The value of the mean power $P_M$ then increases to compensate the current lack of power over the rest of the day (curve C). Likewise, the control unit 6 permanently updates the actual value of the maximum acceptable power $P_{MAX}$ (curve B) according to the actual temperature progression.

The irradiance increases from time $t_0$ and the power delivered by the generator 2 (curve D) also becomes equal to the charging setpoint power $P_L$ at time $t_1$. The control unit 6 then limits the actual charging power supplied to the battery 1 by the power regulator 3 to the value $P_L = P_M$ (11 W in the example considered). Curves C and F then follow each other exactly until time $t_2$, so long as the power delivered by the generator 2 (curve D) is greater than or equal to the mean power $P_M$ constituting the charging setpoint power $P_L$. The control unit 6 thus limits the charging power during a first charging plateau to constant power between times $t_1$ and $t_2$.

After a peak has been reached between $t_1$ and $t_2$, the irradiance continues to decrease after $t_2$, and up to a time $t_3$, the power supplied by generator 2 (curve D) remains lower than setpoint power $P_L$. Photovoltaic panel 2 is no longer able to supply the required power. The actual charging power is then equal to the power supplied by generator 2, i.e. curves D and F are the same. As between times $t_0$ and $t_1$, actual charging power (curve F) being lower than mean power $P_M$ (curve C) initially calculated for a uniform spread of charging over the scheduled period of sunlight, mean power $P_M$ increases between times $t_2$ and $t_3$ (curve C) to compensate for the lack of power supplied to battery 1. Between $t_2$ and $t_3$, the different powers and energies are recalculated and compared. In the example considered, with the actual climatic conditions, the recalculated maximum energy $E_{MAX}$ (110 Wh) is still greater than the required energy E (80 Wh), and the mean power $P_M$ (curve C) remains lower than the corresponding value of maximum charging power (curve B) between $t_2$ and $t_3$. The setpoint power $P_L$ then remains exactly the same as the mean power $P_M$.

The irradiance and temperature increase and the power (curve D) able to be delivered by generator 2 becomes equal to the setpoint power $P_L$ from time $t_3$. As between $t_1$ and $t_2$, the required energy E is less than the maximum energy $E_{MAX}$ and the mean power (curve C) is less than the maximum acceptable power (curve B), the actual charging power is then exactly the same, between $t_3$ and $t_4$, as the mean power (curve C and F are identical) for a uniform spread of charging over the scheduled sunlight period.

From time $t_4$, as the temperature continued to increase, the maximum acceptable power $P_{MAX}$ (curve B) becomes less than the mean power $P_M$ (curve C). Under these conditions, the setpoint power $P_L$ is set to the value of the maximum acceptable power $P_{MAX}$. Curves B and F are then the same. The control unit 6, calculating a deficit of power supplied to the battery 1, then increases the value of the mean power $P_M$ to compensate the lack of power over the rest of the sunlight period (curve C).

Between $t_4$ and $t_5$, the control unit 6 recalculates the required energy E and the maximum energy $E_{MAX}$, compares them and then determines, at a time $t_{4b}$, that the maximum energy has become less than the required energy ($E_{MAX} < E$) in the example involved. The control unit 6 then sets the setpoint power $P_L$ to the same value as the maximum acceptable power $P_{MAX}$. The actual charging power (curve F) thus remains at the same value as the maximum acceptable power $P_{MAX}$ (curve B).

At time $t_5$, as the temperature has dropped, the mean power $P_M$ drops back below the maximum acceptable power $P_{MAX}$ the control unit 6 then sets the setpoint power $P_L$ to the same value as the mean power $P_M$.

At the end of the day, at time $t_6$, the irradiance decreases and the photovoltaic panel 2 is no longer able to supply the mean power $P_M$. The charging power (curve F) is then equal to the power supplied by the generator 2 (curve D). The control unit 6 then increases the value of the mean power $P_M$ to compensate the lack of power over the rest of the sunlight period (curve C).

Whereas, in the embodiment described above, the charging setpoint power $P_L$ is equal to the mean power $P_M$ if and only if the required energy E is less than the maximum energy and if the mean power $P_M$ is less than the maximum acceptable power $P_{MAX}$, the setpoint power $P_L$ being equal to the maximum power in the other cases, an alternative of the embodiment can be used to increase the quantity of power supplied to the battery 1. Other criteria concerning the setpoint power $P_L$ are then used. The charging setpoint power $P_L$ is equal to the mean power $P_M$ if and only if the required energy E is less than the maximum energy $E_{MAX}$ and if the mean power $P_M$ is still less than the minimum of the maximum power $P_{MAX}$ estimated over the forthcoming day. If this is not the case, the required energy E being greater than the maximum energy $E_{MAX}$ or the minimum of the maximum power $P_{MAX}$ estimated over the forthcoming day being lower than the mean power $P_M$, then the control unit 6 controls the regulator 3 in such a way that the charging setpoint power $P_L$ is equal to the maximum power $P_{MAX}$.

In another alternative embodiment that is able to be combined with the previous embodiments, to be more sure of charging the battery 1, the control unit 6 can take a corrective factor into account when the charging setpoint power $P_L$ is normally equal to the mean power $P_M$. Under these conditions, the corrective factor can for example be constant or a function of the power remaining to be supplied to the battery 1. The corrective factor should preferably be determined such that the charging setpoint power $P_L$ is comprised between the mean power $P_M$ and the maximum power $P_{MAX}$, if the mean power $P_M$ is lower than the maximum power $P_{MAX}$.

A corrective factor can also be introduced on the maximum power $P_{MAX}$ if required (the corrective factor advantageously being less than 1 to avoid charging directly at this maximum power).

Another alternative embodiment can be envisaged in order to protect battery better. The control unit 6 determines a maximum state of charge SOCM acceptable by the battery 1 according to the temperature so as to no longer perform full charging of the battery 1 in prejudicial temperature ranges, as was done before. For example, the maximum state of charge SOCM acceptable for the forthcoming day depends on the maximum ambient temperature for the forthcoming day. Control unit 6 then determines the current state of charge SOC of the battery 1 and therefore the required energy E to charge the battery 1 to the acceptable maximum state of charge SOCM. The maximum state of charge SOCM can also be calculated continuously according to the actual temperature progression.

The invention claimed is:
1. A method for charging a power storage element of an autonomous system comprising electronic components from a generator, with limiting, according to the temperature, of the power supplied to the storage element to a charging setpoint power, method comprising estimating the time period during which the power resource available to the generator is, up to a preset moment, greater than a preset threshold value, estimating the temperature progression up to said moment, estimating the progression of a maximum acceptable power up to said moment, according to the temperature progression and to data representative of the reliability of the system according to the temperature, determining the energy required to charge the storage element, calculating, according to the energy required and to said time period, of a theoretical mean power spread over said time period to come, to be delivered to the storage element to charge the latter completely, estimating from the maximum acceptable power of a maximum energy during the time period to come able to be delivered by the generator, determining a charging setpoint power according to the comparison between the required energy and the maximum energy and to the comparison between the mean power and the maximum charging power.

2. The method according to claim 1, wherein the value of the charging setpoint power is equal to the mean power if the required energy is less than or equal to the maximum energy and if the mean power is less than the maximum acceptable power, the value of the charging setpoint power being equal to the maximum acceptable power in the other cases.

3. The method according to claim 1, wherein the value of the charging setpoint power is equal to the mean power if the required energy is less than or equal to the maximum energy and if the mean power is less than the minimum of the maximum acceptable power estimated for the forthcoming period, the value of the charging setpoint power being equal to the maximum acceptable power in the other cases.

4. The method according to claim 1, comprising determination of a maximum acceptable state of charge of the storage element according to the temperature, the required energy being the power required to charge the storage element to the maximum state of charge.

5. The method according to claim 1, wherein the required energy is the power required to charge the storage element completely.

6. The method according to claim 1, wherein temperature measurement comprises measurement of the ambient temperature.

7. The method according to claim 1, wherein temperature measurement comprises a measurement representative of the temperature of the electronic components.

8. The method according to claim 1, wherein the generator being a photovoltaic generator, the period during which the power resource is available represents the period of sunlight.

9. The method according to claim 1, wherein the generator being a micro-hydraulic generator, said period represents the time during which the hydraulic flowrate is greater than a preset threshold.

10. The method according to claim 1, wherein power production by means of the generator being intermittent and quasi-periodic, the autonomous system comprises recording of its operating conditions over a predetermined number of periods.

11. The method according to claim 10, wherein the maximum energy is determined taking the operating conditions over a predetermined number of immediately preceding periods into account.

12. The method according to claim 10, wherein the recorded operating conditions comprise the temperature, the effective operating time of the generator and/or the progression of the required power.

13. The method according to claim 1, wherein the data representative of reliability comprises at least data relating to reliability of the electronic components and of the storage element.

14. The method according to claim 13, wherein the data representative of the reliability of the system is represented by the mean time between failures.

15. The method according to claim 13, wherein the data representative of the reliability of the system is represented by a plurality of curves defining the maximum acceptable power versus temperature, for a given reliability criterion.

16. The method according to claim 1, wherein the charging setpoint power is equal to the mean power and a corrective factor, the setpoint power being lower than the maximum power.

* * * * *